United States Patent
Ayala

(10) Patent No.: US 11,390,464 B1
(45) Date of Patent: Jul. 19, 2022

(54) CHAIN SLACK ADJUSTMENT MECHANISM FOR MAIL SORTATION SYSTEMS

(71) Applicant: National Presort, L.P., Fort Worth, TX (US)

(72) Inventor: Fred Ayala, Fort Worth, TX (US)

(73) Assignee: National Presort, L.P., Fort Worth, TX (US)

(*) Notice: Subject to any disclaimer, the term of this patent is extended or adjusted under 35 U.S.C. 154(b) by 0 days.

(21) Appl. No.: 17/173,377

(22) Filed: Feb. 11, 2021

(51) Int. Cl.
*B65G 23/44* (2006.01)
*B07C 3/08* (2006.01)

(52) U.S. Cl.
CPC .............. *B65G 23/44* (2013.01); *B07C 3/08* (2013.01)

(58) Field of Classification Search
CPC .................................. B65G 23/44; B07C 3/08
USPC .................................... 198/814, 816, 810.04
See application file for complete search history.

(56) References Cited

U.S. PATENT DOCUMENTS

| | | | | |
|---|---|---|---|---|
| 2,753,039 A * | 7/1956 | Frankx | ................. | B65G 17/063 198/814 |
| 2,776,046 A * | 1/1957 | Haas | .................... | A47L 15/248 198/816 |
| 2,808,924 A * | 10/1957 | Wood | .................... | B65G 23/44 198/816 |
| 3,952,861 A * | 4/1976 | Holmqvist | ............. | B65G 21/00 198/816 |
| 4,375,845 A * | 3/1983 | Chambers | .............. | B65G 19/28 198/570 |
| 4,564,099 A * | 1/1986 | Uozumi | ................ | B66B 29/005 198/323 |
| 4,759,438 A * | 7/1988 | Nevo-Hacohen | ...... | B65G 23/44 198/810.04 |
| 5,054,608 A * | 10/1991 | Bryant | .................... | B65G 23/44 198/816 |
| 5,302,162 A * | 4/1994 | Pasero | ................... | A63B 22/02 198/814 |
| 7,140,486 B2 * | 11/2006 | Kim | ......................... | F16H 7/08 198/810.03 |
| 8,636,140 B2 * | 1/2014 | Tout | ....................... | B65G 43/00 198/814 |
| 8,910,778 B1 * | 12/2014 | Francisco | .............. | B65G 39/16 198/814 |

FOREIGN PATENT DOCUMENTS

KR  20200107056 A *  9/2020  ............. B65G 23/44

* cited by examiner

*Primary Examiner* — James R Bidwell
(74) *Attorney, Agent, or Firm* — James E. Walton

(57) ABSTRACT

A mail sortation system includes a frame system, a conveyor carried by the frame system, a driven axle on one end of the conveyor, a pair of split idler axles, one idler axel on each side of the conveyor, a chain from each idler axel to the driven axel, and a chain slack adjustment mechanism. The idler axels are configured to rotate independently of each other. The chains are coupled to the conveyor, such that rotation of the driven axle causes the idler axles to rotate and the conveyor to translate. The chain slack adjustment mechanisms remove slack in each chain by increasing the distance between the driven axle and the idler axles.

20 Claims, 13 Drawing Sheets

CHAIN SLACK ADJUSTMENT MECHANISM FOR MAIL SORTATION SYSTEMS

1. TECHNICAL FIELD

The present application relates to sortation conveyor systems, in particular, the chain tensioning on shoe sorter transports used in such sortation conveyor systems for sorting mail, such as letters, flats, parcels, trays, and polybags along sorter conveyor systems in parcel sorting machines.

2. DESCRIPTION OF RELATED ART

Machines for automatically sorting items such as mail, parcels and trays, into one of an array of selected bins, bags, tubs, cardboard containers, or compartments, are common. Typically, such sorting machines have a feed mechanism that inducts articles one-at-a-time onto belts and/or onto conveyors. Sensing components along the travel path monitor and track the movement of the articles. Belts and/or conveyors feed items onto a transport which has multiple slats, driven by chains, that transport each item down the sorter's length. When an item has reached an identified discharge location, control electronics command diverting gate assemblies or other redirecting mechanisms to discharge the item from the transport slats into a specific destination compartment or bin.

Conventional chain driven sortation systems use two chains spanning between a motor driven axle with chain sprockets on one end of the machine, and a second non-powered idler axle also with chain sprockets. These axels are usually solid and span across the full width of the transport. The chains must remain in tension between the driven and idler axles for the sorter to safely carry the parcel transport slats and otherwise function properly. The solid drive axle to solid idler axle arrangement used in parallel chain driven systems, such as used in parcel sorting systems, significantly contributes to chain wear. This type of wear is due to typical uneven parcel weight loading on the chain driven slats, which causes a diagonal torqueing action of the chains against the sprockets. This twisting motion of the chains against the sprockets significantly aggravates chain wear, which in turn accelerates the need for chain length adjustment.

Due to such wear, along with normal wear and tear, the chains increase in length such that the chains must be manually shortened to eliminate excessive chain slack by removing slats and chain links from the chains on both sides of the sorter. Manually shortening these chains is a very time consuming process, which causes a loss of the sorter's production time and the associated loss of considerable item processing profits. Although great strides have been made in the area of chain driven sortation systems, significant shortcomings remain.

BRIEF DESCRIPTION OF THE DRAWINGS

The novel features believed a characteristic of the system of the present application is set forth herein. However, the system itself, as well as a preferred mode of use, along with further objectives and advantages thereof, will best be understood by reference to the following detailed description when read in conjunction with the accompanying drawings, wherein.

Figure 1:
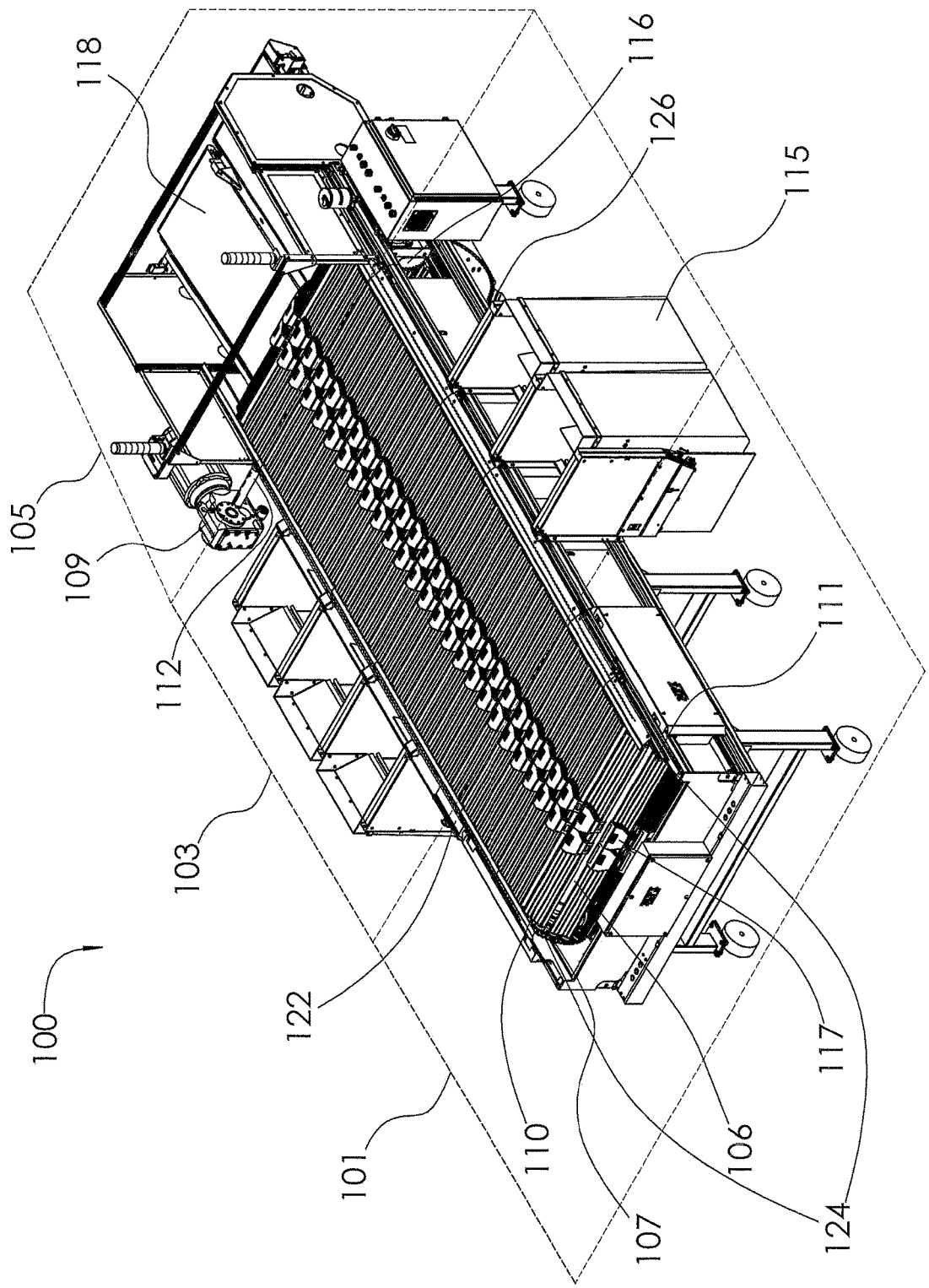
FIG. 1 is a perspective view of a conventional item sortation conveyor system.

While the system of the present application is susceptible to various modifications and alternative forms, specific embodiments thereof have been shown by example in the drawings and are herein described in detail. It should be understood, however, that the description herein of specific embodiments is not intended to limit the method to the particular forms disclosed, but on the contrary, the intention is to cover all modifications, equivalents, combinations, and alternatives falling within the spirit and scope of the present application.

DETAILED DESCRIPTION OF THE PREFERRED EMBODIMENT

Illustrative embodiments of the chain slack adjustment mechanism for mail sortation systems of the present application are described below. In the interest of clarity, not all features of an actual implementation are described in this specification. It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms, to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 2:
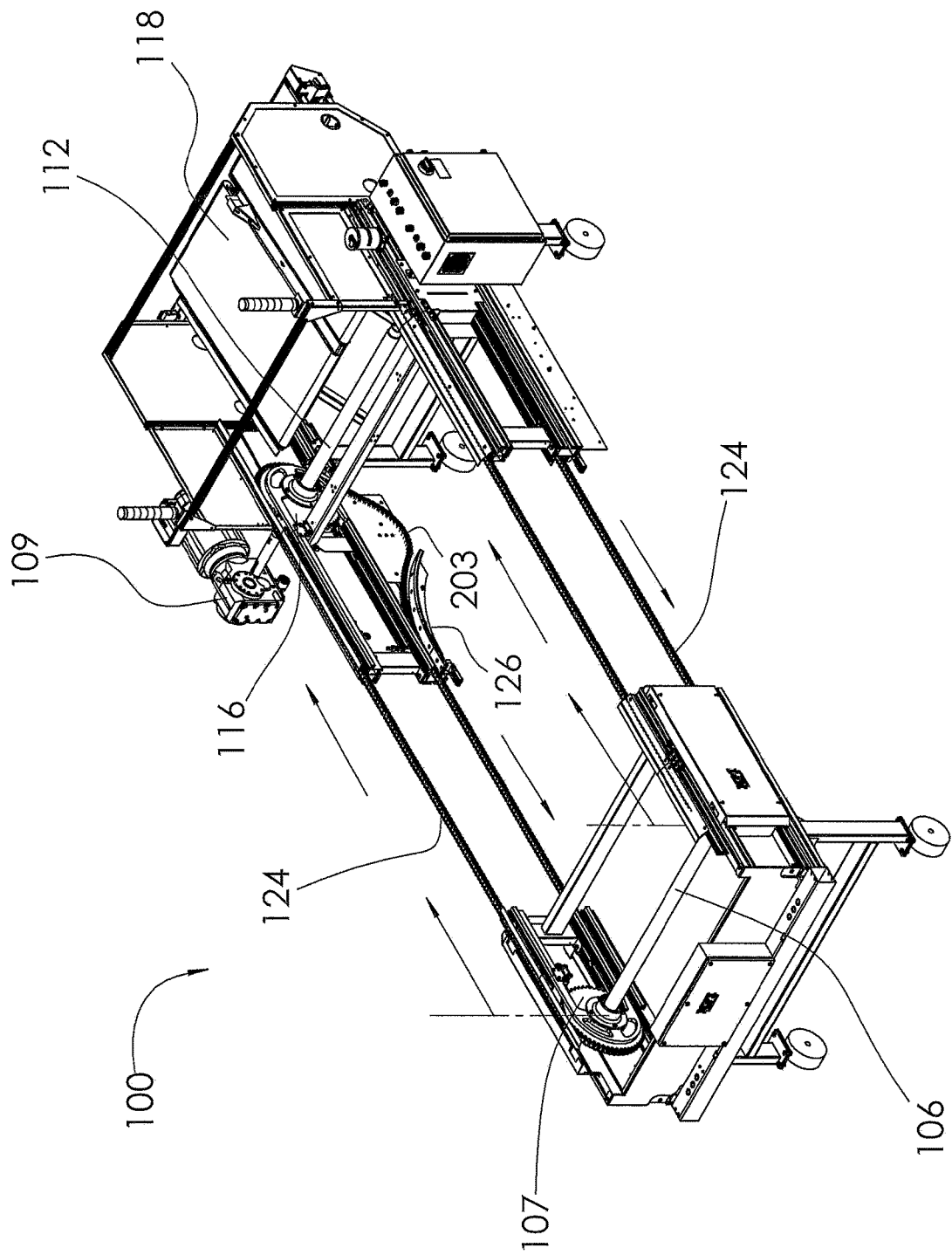
FIG. 2 is a simplified perspective view of the item sortation conveyor system of FIG. 1.

Referring now to FIGS. 1-4 in the drawings, a conventional chain and slat sortation conveyor system 100 is shown. As shown in FIG. 1, sortation conveyor system 100 is logically divided into three parts—a front section 101, a middle section 103, and an end section 105. A longitudinal conveyor 110 extends through each of sections 101, 103, and 105. Front section 101 includes an idler axle 106 having chain sprockets 107 and other related carrier assemblies. Middle section 103 includes multiple discharge containers 115. End section 105 includes a chain drive motor 109, a drive axle 112, drive chain sprockets 116, and one or more separate exit conveyors 118 for items that do not get sorted. Conveyor 110 travels from left to right, as shown in FIGS. 1 and 2, between front section 101 and rear section 105. Conveyor 110 includes multiple slats 111 that extend transversely across conveyor 110. Slats 111 are configured to carry block-shaped shoes 117. Shoes 117 slide along corresponding slats 111 and push items off of slats 111 and into discharge containers 115 according to preprogrammed instructions from a control system 122. It will be appreciated that control system 122 includes multiple sensors, controllers, actuators, etc. Chains 124 located on both sides of conveyor 110 are driven by chain drive motor 109, drive axle 112, and drive chain sprockets 116; and are guided by a drive chain return guide 126.

In operation, various items are received onto slats 111 of conveyor 110 at first section 101. Then, the items traverse along the conveyor 110 through middle section 103. Then, at the appropriate time, control system 122 activates shoes 117 causing the items to be discharged into the appropriate discharge containers 115.

Figure 3:
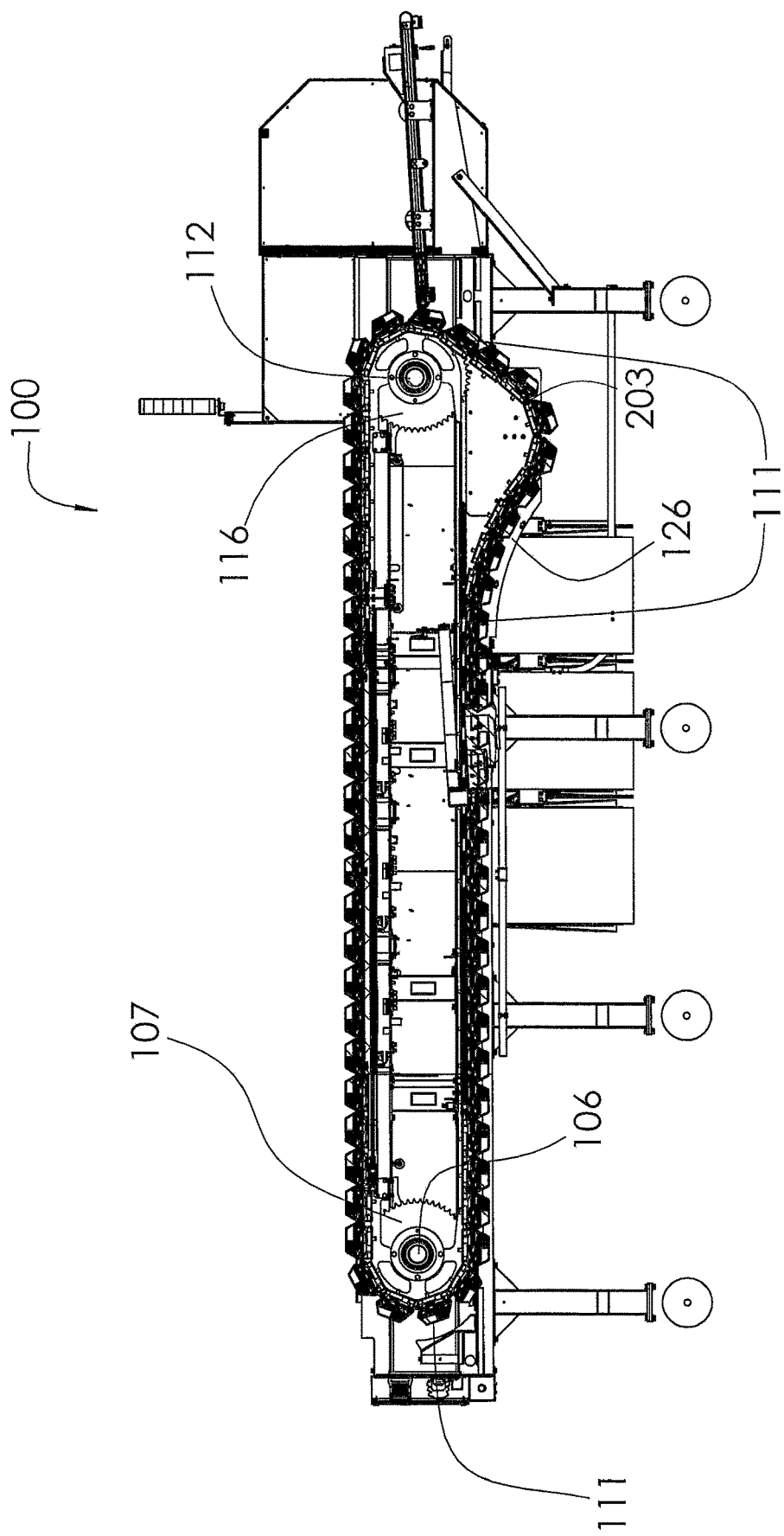
FIG. 3 is a side view of the item sortation conveyor system of FIG. 1.

As shown in FIGS. 2 and 3, chain slack accumulates at the bottom return path just below drive axle 112 at the rear of conveyor system 100. The slack in chain 124 is guided by chain return guide 126. Excessive chain wear eventually requires both chains 124 to be replaced. Chains 124 are large, heavy, specially made for the application and are very expensive in chain cost, labor to replace them, and system down time production losses during replacement. Therefore, reducing chain wear becomes a major cost avoidance issue for economical sorter operation.

Chain slack 203 at the rear module accumulates from chain wear. Chain return guide 126 directs the chain slack back into a chain return channel under conveyor 110. If chain slack 203 becomes excessive, chain 124 and slats 111 could snag on chain return guide 126, causing catastrophic damage to conveyor system 100. An excessive chain slack sensor is commonly provided at the apex of chain slack 203 to halt conveyor system 100 if the acceptable chain slack length is exceeded. When the chain slack is in excess of the acceptable length, chains 124 must be split, slats and chain links removed, and the chains joined back together before sorter operation can continue.

Figure 4:
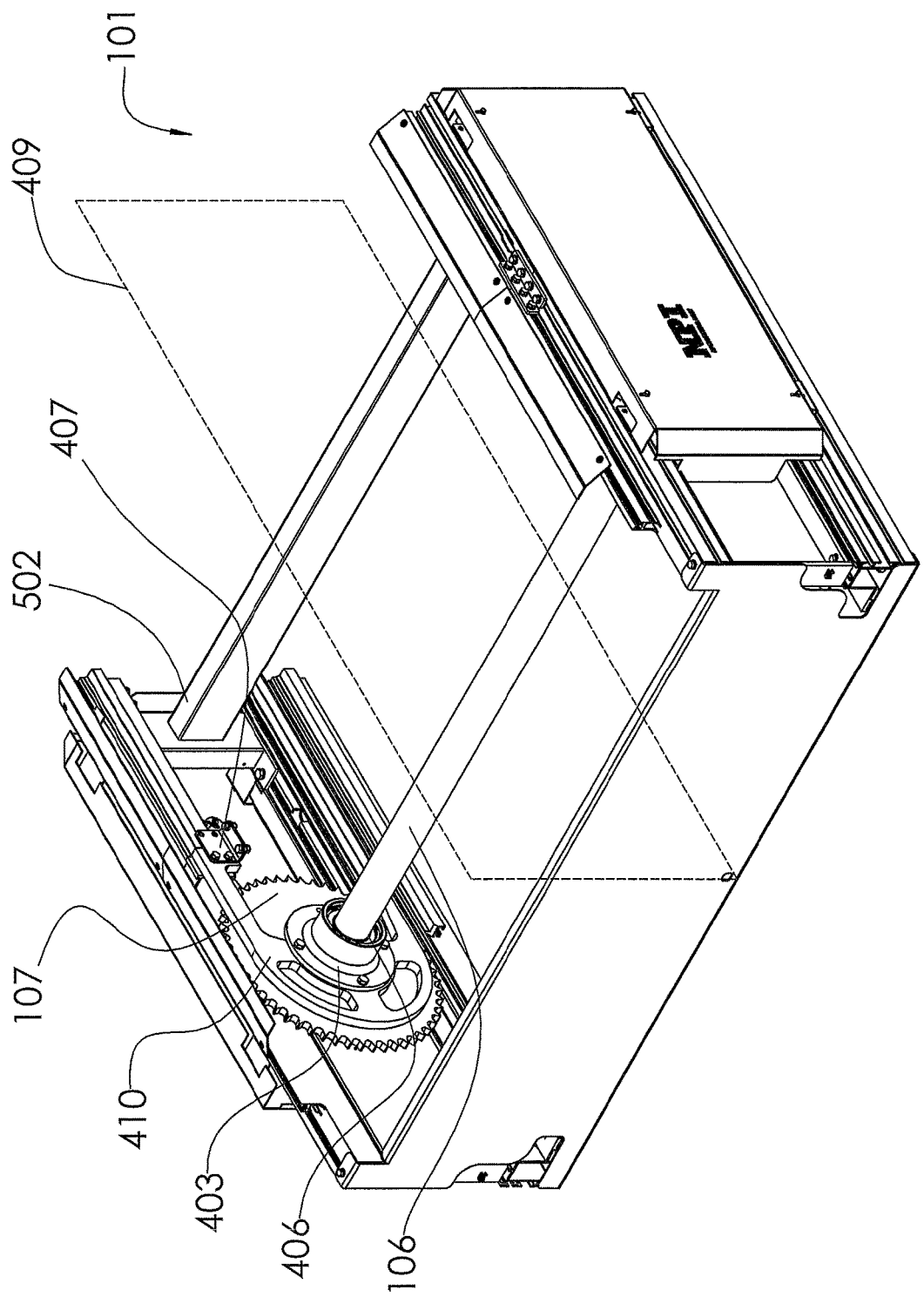
FIG. 4 is an enlarged perspective view of the idler axle and sprocket assembly of the item sortation conveyor system of FIG. 2.

Referring now specifically to FIG. 4 in the drawings, a partial close-up perspective view from inside front section 101 is illustrated. The following description pertains to one side of the idler axle assembly, with the other side being a mirror image. An axle carrier assembly 501 mounts directly to a sorter frame 502 with mounting hardware 407. Idler axle 212, an axle bearing 406, and idler gear 108 are mounted to axle carrier assembly 410 with an axle-bearing hub 403. The axle and sprocket assemblies are free to rotate, being supported by bearings 406 in the axle-bearing hub 403. The horizontal axle assembly centerline, with relationship to the entire sorter, is shown by the indicated dashed plane 409.

Figure 5:
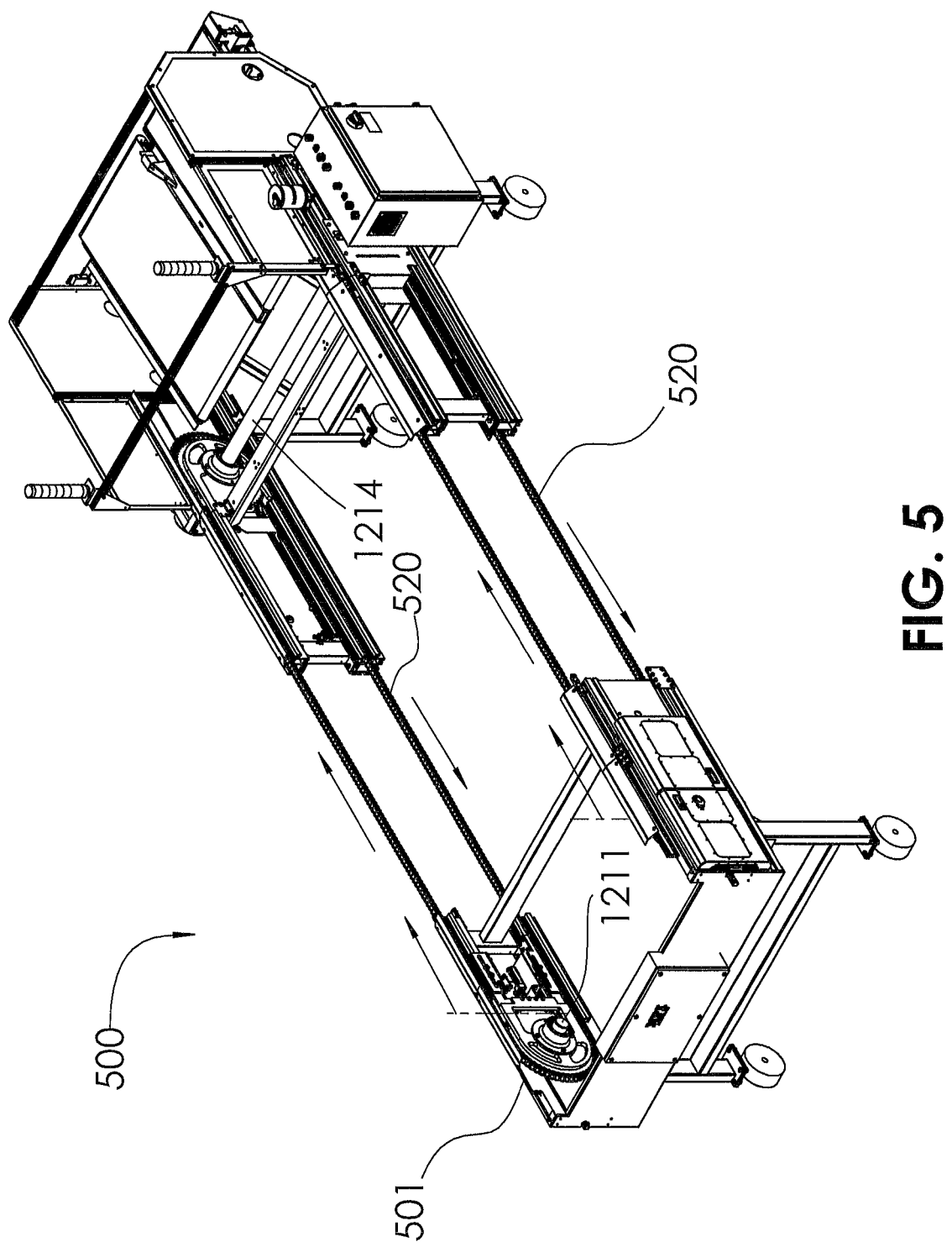
FIG. 5 is a simplified perspective view of a mail sortation system having a chain slack adjustment mechanism according to the preferred embodiment of the present application.
Figure 6:
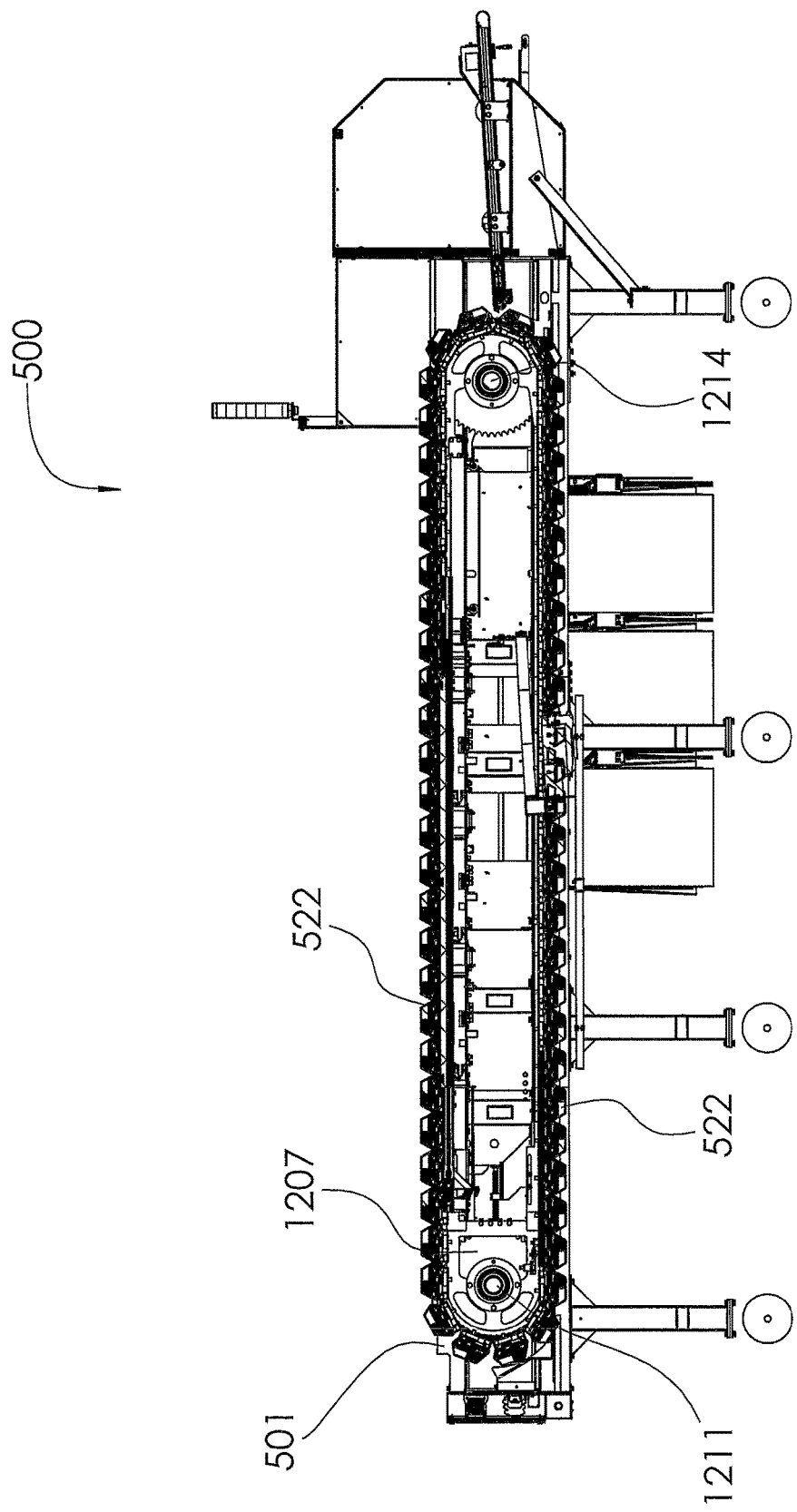
FIG. 6 is a side view of the mail sortation system of FIG. 5.
Figure 7:
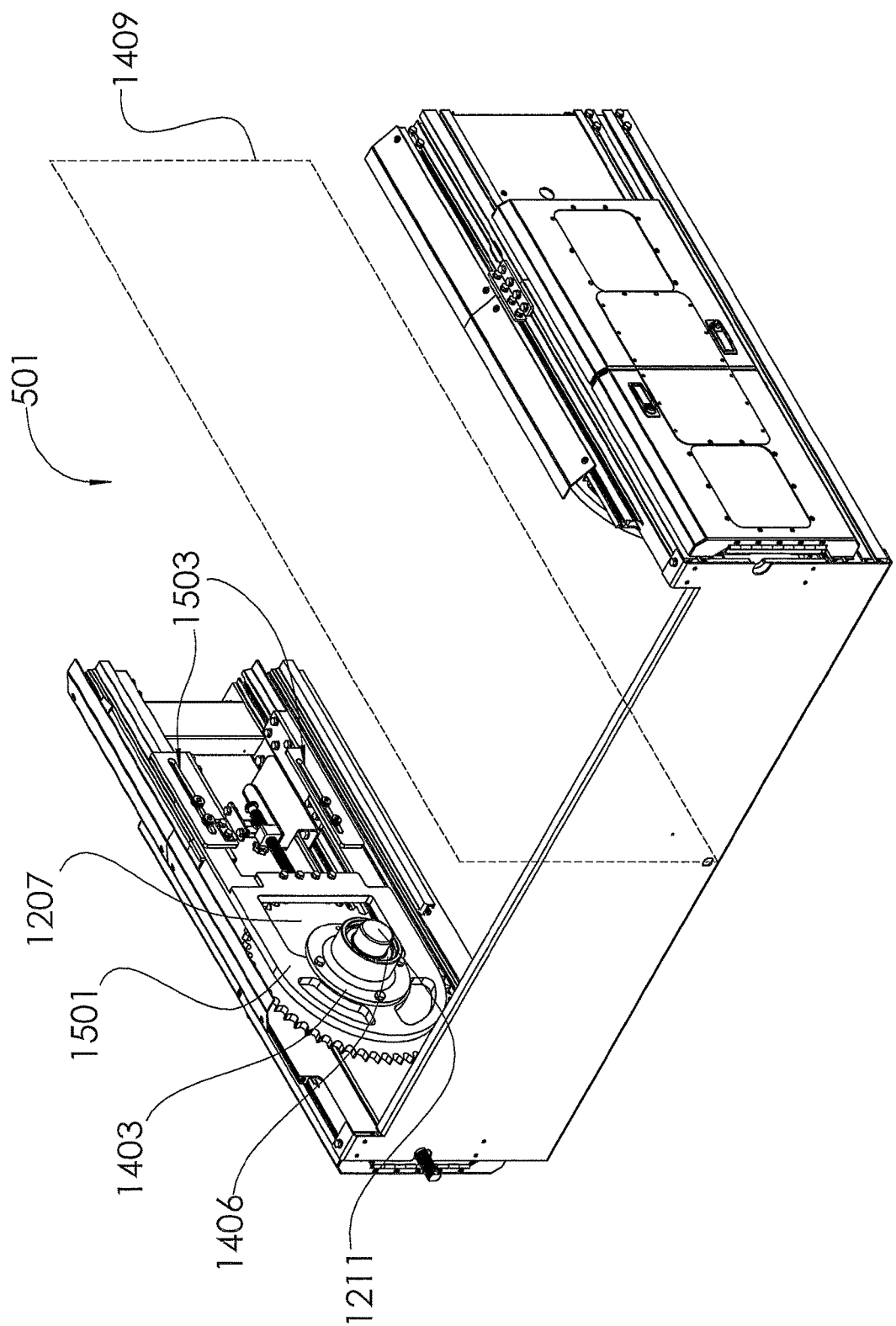
FIG. 7 is an enlarged perspective view of a split idler axle assembly of the mail sortation system of FIG. 5.

Referring now to FIGS. 5-7 in the drawings, a mail sortation system 500 having a chain slack adjustment mechanism 501 according to the present application is illustrated. In system 500, there is no chain slack loop. This is accomplished by the chain slack being adjusted out of the system by increasing the distance between idler axles 1211 (see FIG. 6) and driven axle 1214, until no slack remains, by actuating chain slack adjustment mechanism 501. Chain slack adjustment mechanism 501 provides a method to adjust the chain slack out of the system. Chain slack adjustment assembly 501 also provides spring tension on idler axle assembly to absorb minor shocks to chains 520 due to the inertial forces caused by the starting and stopping of conveyor system 500, and the placement and subsequent removal of asymmetrically loaded heavy articles on slats 522.

In the conveyor systems of the present application, no chain slack return guides are required at the rear of the sorter, as the chain slack has been eliminated. As is shown, the single shaft front idler axle 106 of the prior-art conveyor 100 has been replaced by two short independent (stub) idler axles 1211, one on each side, with each stub idler axle 1211 being coupled to and adjusted by chain slack adjustment mechanisms 501. By incorporating independent stub idler axles 1211 as a part of chain slack adjustment mechanism 501, chain wear is significantly reduced, chain life is extended, and the need for chain length adjustments is reduced. This configuration improves chain dynamics, because each chain 520 may be independently adjusted and tensioned to prevent uneven chain wear caused by uneven side-to-side slat loading during normal sorter operation.

Another novel feature of chain slack adjustment mechanism 501 is that by using two separate independent stub idler axles 1211, chains 520 are free to accommodate the unequal torque forces generated due to uneven item weight distribution across slats 522 down the length of conveyor system 500. Chain slack adjustment mechanisms 501 may be selectively moved towards the front end of sortation system 500 to provide adjustment of chain slack, by increasing the distance between the stub idler axles 1211 and drive axle 1214. An idler gear 1207 is attached to each stub idler axle 1211 and rotates therewith. Each stub idler axle 1211 is supported by an axle bearing 1406, which is retained by an axle bearing hub 1403, each of which in turn is mounted to an idler axle carrier assembly 1501. Each idler axle carrier assembly 1501 is configured to slide front-to-back inside a captured channel having a longitudinal slot for receiving guide pins 1703 from idler axle assembly 1501. By using two stub idler axles 1211, the left and right side conveyor chains 520 are decoupled. This allows the left and right side chains 520 to skew relative to each other in reaction to typical differential loading across conveyor slats 522. This resulting chain skewing action is absorbed by the chain slack adjustment springs 1616 and the idler axle carrier slide assembly 1603 (see FIG. 8). By preventing the common chain binding caused with the prior-art design, a significant reduction in chain wear results, dramatically increasing the time before a system shutdown is required for slat and chain link removal, reducing costly sorter down time.

Figure 8:
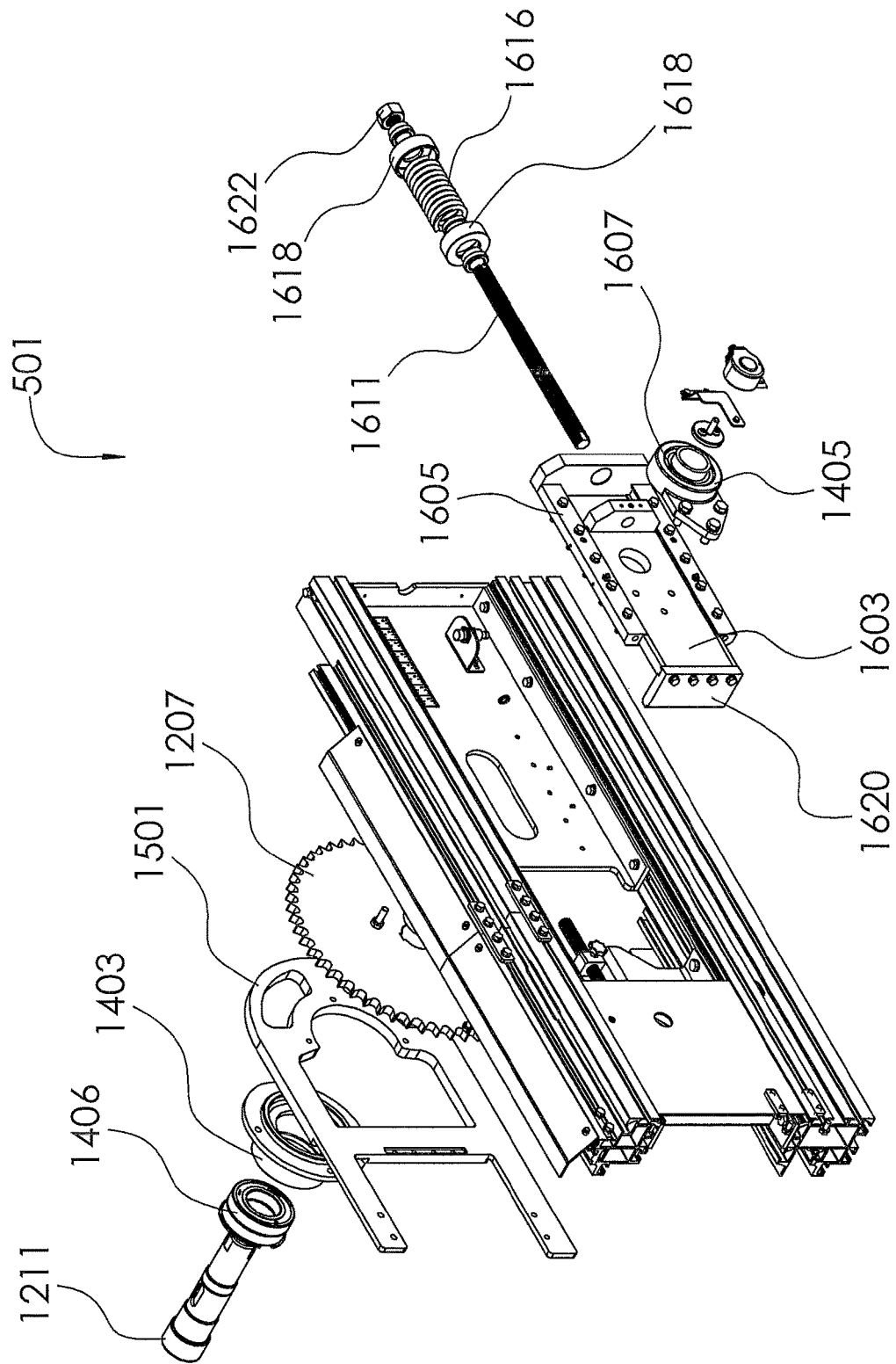
FIG. 8 is an exploded view of the chain slack adjustment mechanism of FIG. 7.

Referring now also to FIG. 8 in the drawings, an exploded perspective view of chain slack adjustment mechanism 501 is illustrated. A slide assembly 1603 is shown captured by retaining slide rails 1605. One outer stub idler axle 1211 and an axle-bearing hub 1403 are mounted to movable slide assembly 1603. Stub idler axle 1211 passes through adjustment slide assembly 1603 to mount to idler gear 1207 and an inside axle bearing 1607 and an inner axle bearing hub 1403. Inner axle bearing hub 1403 is mounted to sliding idler axle assembly 1501, which is retained by guide pins 1703 (see FIG. 9) captured by guides mounted to the inside of conveyor frame 1503 (see FIG. 7). An adjustment rod assembly 1611 is fastened to an adjustment slide 1620 using a bulkhead plate 1617 (see FIG. 9). Adjustment rod assembly 1611 includes bulkhead plate 1617, a spring 1616 with end caps 1618, and an adjusting nut 1622.

Figure 9:
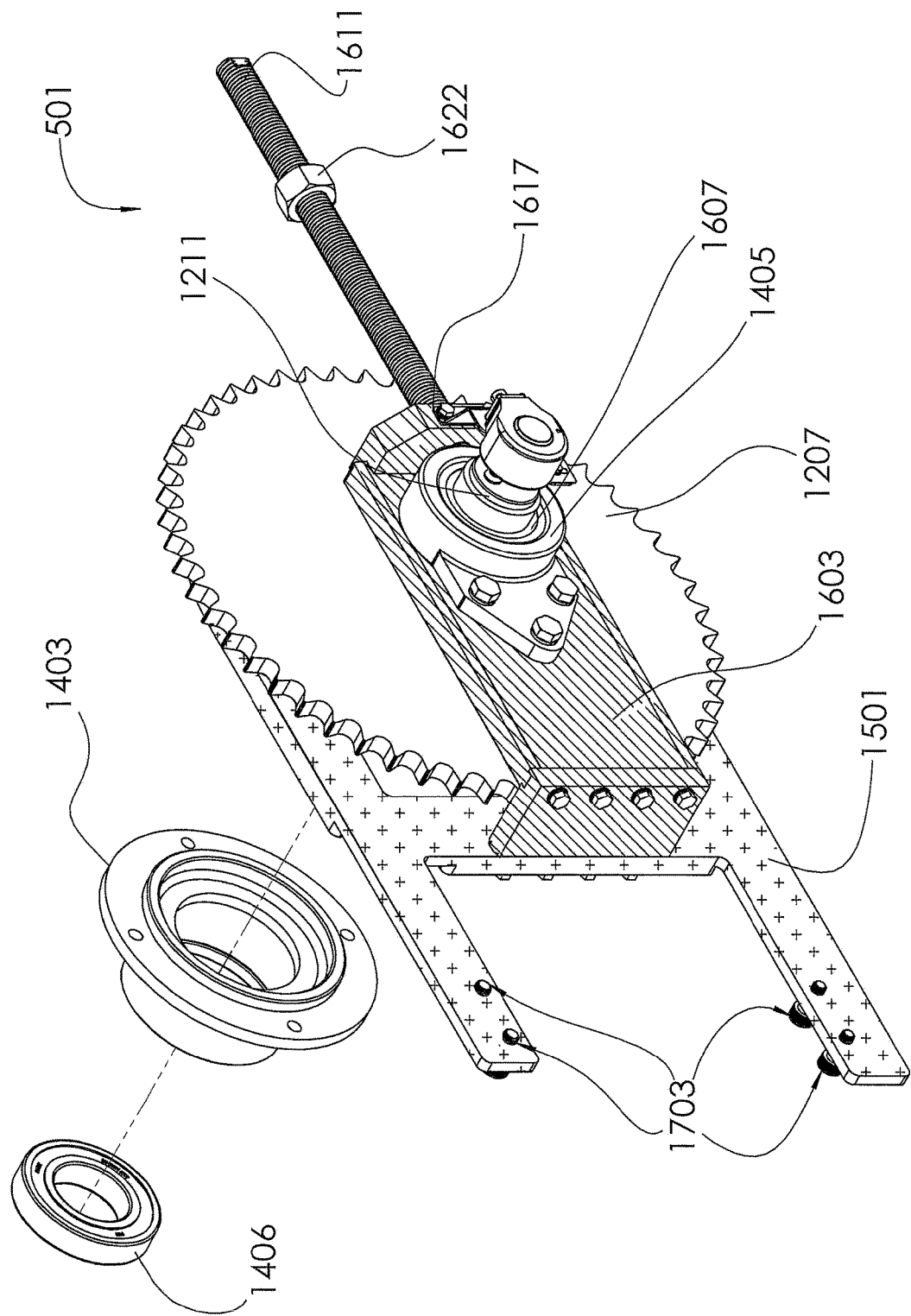
FIG. 9 is an enlarged partial exploded detail view of certain components of the chain slack adjustment mechanism of FIG. 8.

Referring now also to FIG. 9 in the drawings, certain moving components of chain slack adjustment mechanism 501 are illustrated. All components shown in FIG. 9 move toward the left when adjusting nut 1622 on adjustment rod assembly 1611 is tightened. Adjustment rod assembly 1611 is fastened to chain slack adjusting slide assembly at the bulkhead plate 1617. An adjusting slide assembly 1603 is coupled to sliding idler axle carrier assembly 1501. Sliding inner axle support assembly 1501 is maintained level in a back-to-front orientation by guide pins 1703 riding inside pin retainers 1503 (see FIG. 7). Stub idler axle 1211 passes through and is supported by outer bearing 1607, which is captured by outer bearing hub 1405. Stub idler axle 1211 also passes through inner bearing 1406, which is captured and supported by inner axle bearing hub 1403.

Figure 10:
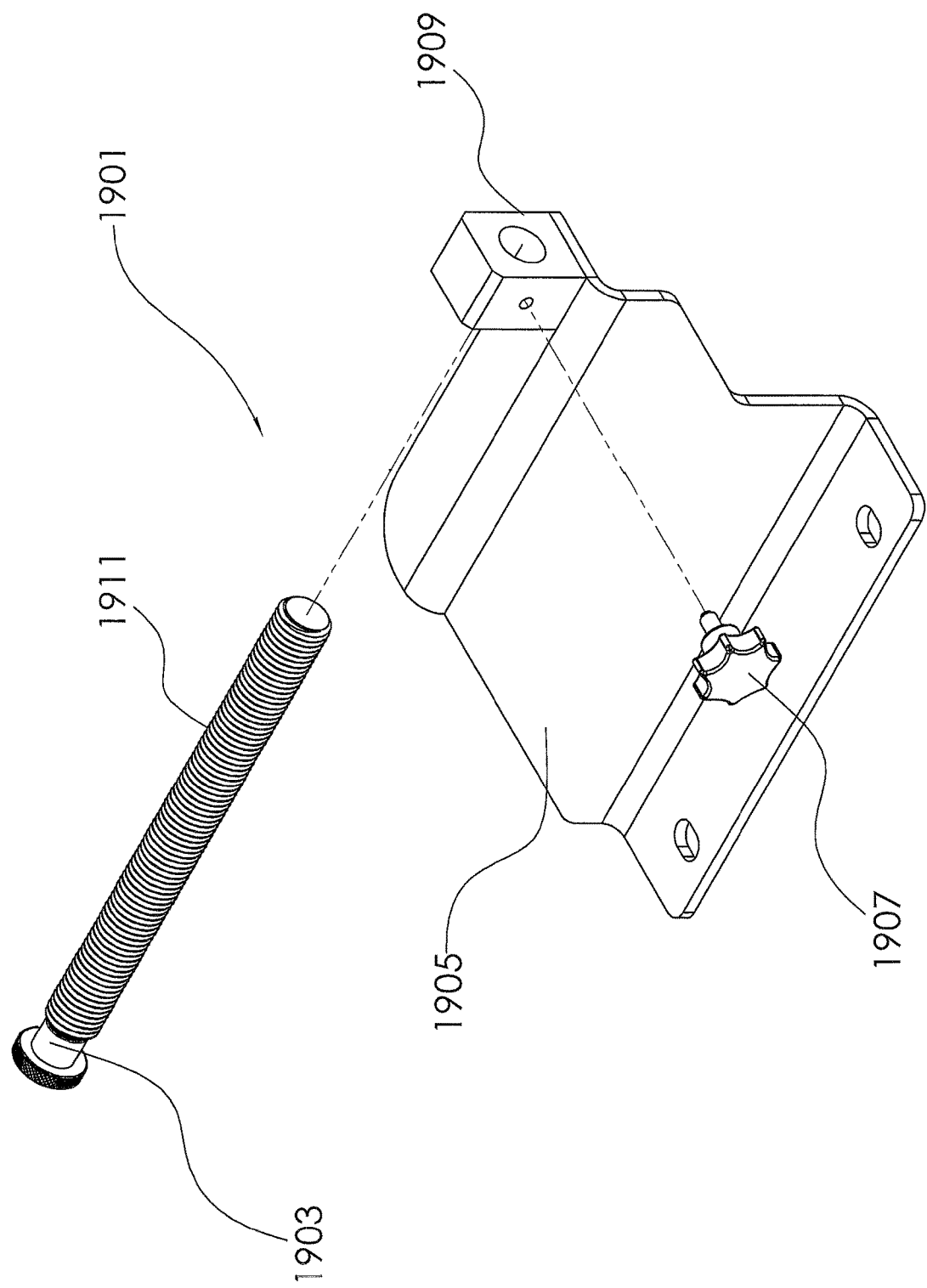
FIG. 10 is another enlarged partial exploded detail view of certain components of the chain slack adjustment mechanism of FIG. 8.

Referring now also to FIG. 10 in the drawings, a slide assembly adjustable stop 1901 is illustrated. Adjustable stop 1901 prevents excessive rearward travel of slide assembly 1603 (see FIG. 8). Adjustable stop 1901 is preferably a threaded adjustment bolt 1911 having a knurled end cap 1903. Adjustable stop 1901 threads into an adjustable stop bracket 1905. Adjustment bolt 1911 is screwed in or out of a threaded portion of bracket 1905, as required for optimum positioning. A lock screw 1907 threads into a threaded nut 1909 on bracket 1905 to lock adjustment bolt 1627 into the desired position.

Figure 11A:
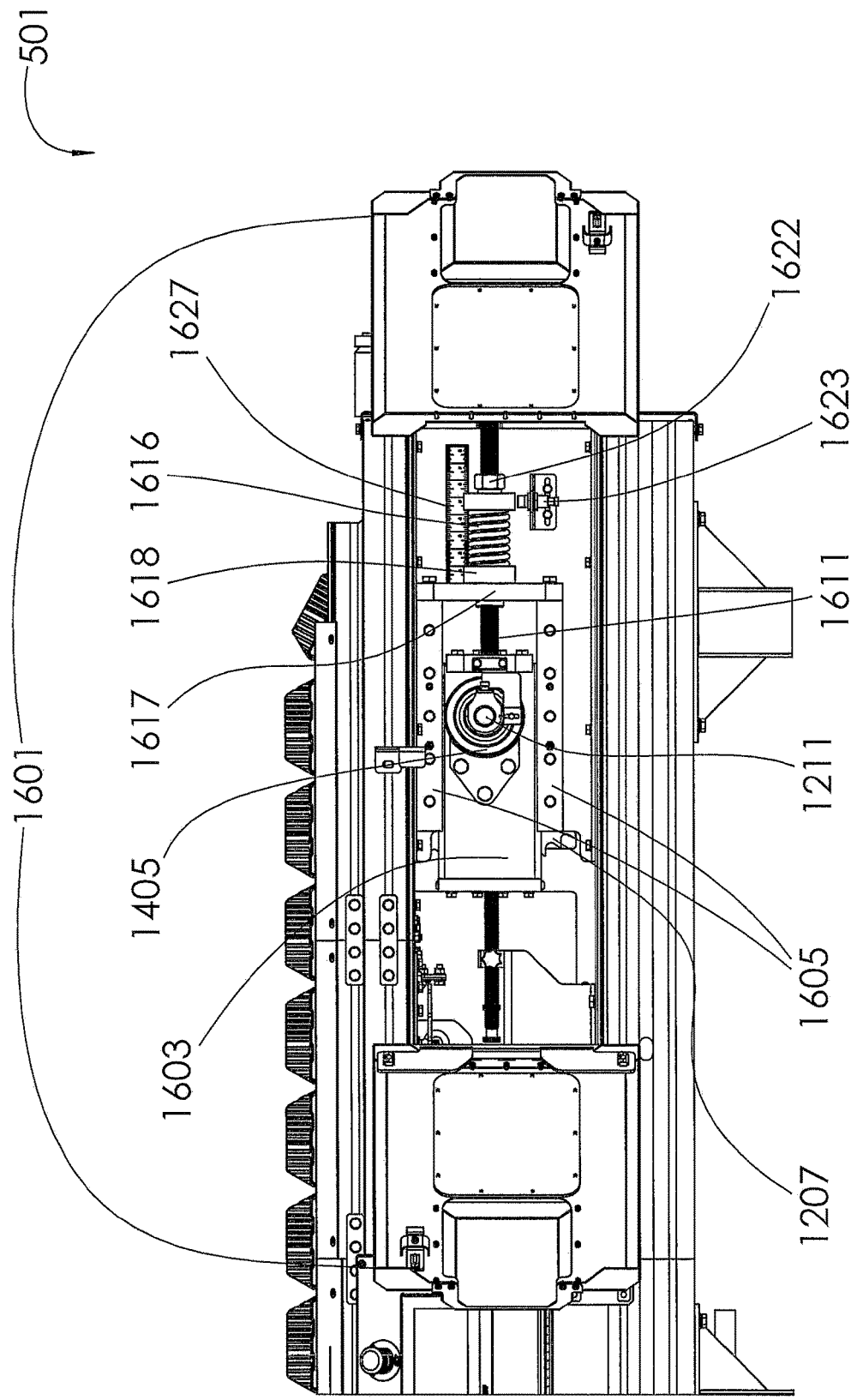
FIG. 11A is an enlarged side view of the chain slack adjustment mechanism of the mail sortation system of FIG. 5.
Figure 11B:
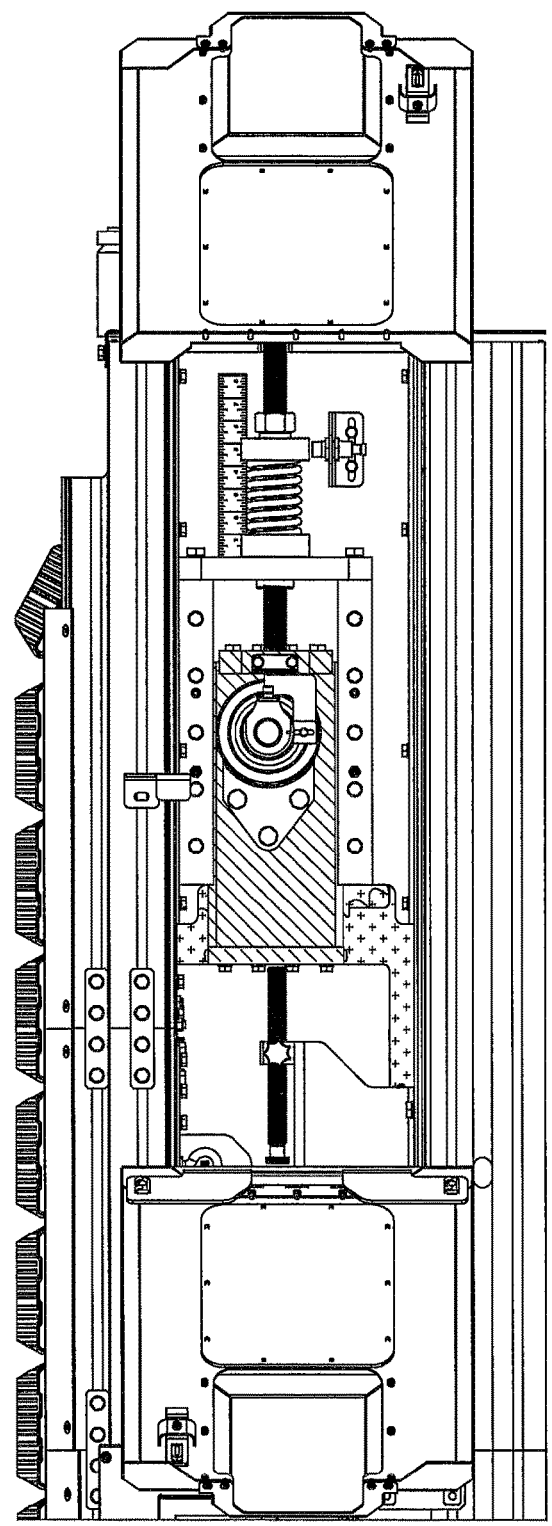
FIGS. 11B and 11C are enlarged side views of the chain slack adjustment mechanism of the mail sortation system of FIG. 5, in which certain components have been shown with cross-hatched lines to illustrate the movement of the chain slack adjustment mechanism.
Figure 11C:
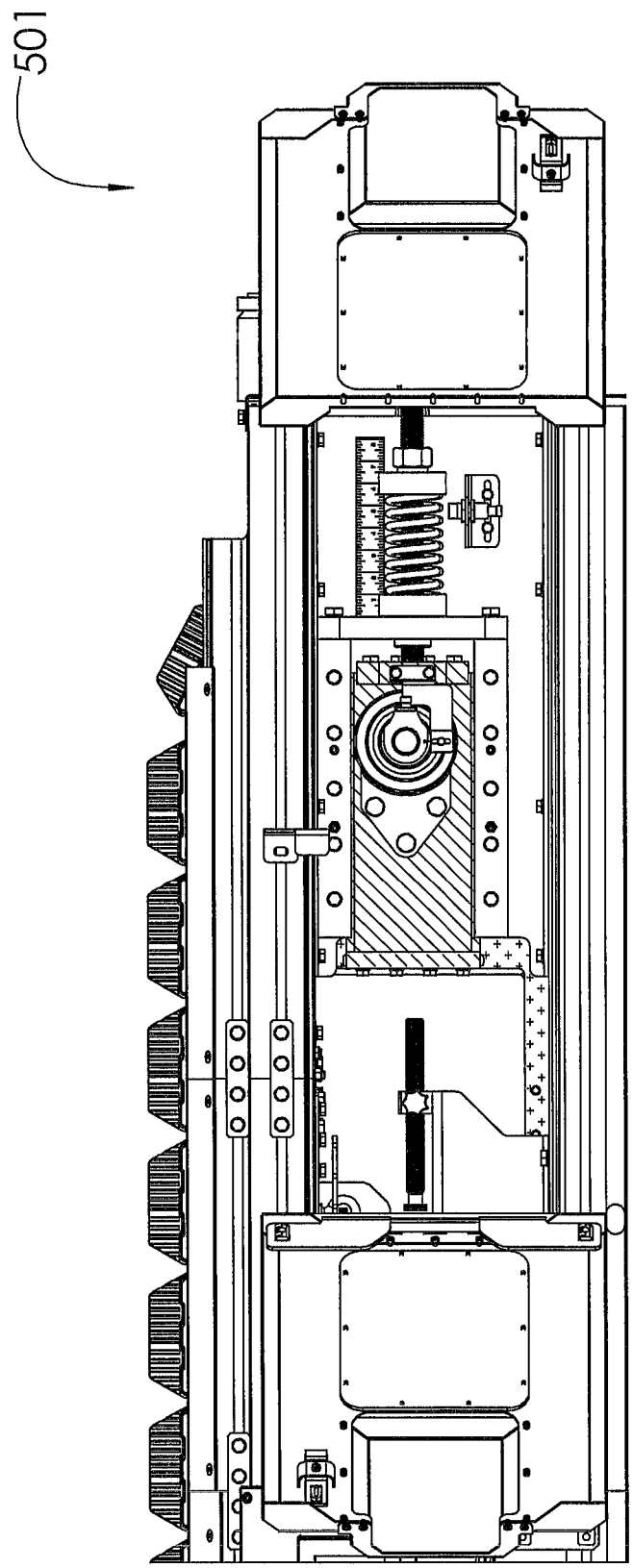

Referring now also to FIGS. 11A-11C in the drawings, the operation of chain slack adjustment mechanism 501 is illustrated. Covers 1601 cover bracket chain slack adjustment mechanism 501 for personnel protection from the moving chains. Idler axle bearing retainer assembly 1405 is mounted to and moves with the adjustment slide assembly 1603 in a back-to-front direction. Adjustment slide assembly 1603 is captured and guided by channeled guide rails 1605 mounted above and below adjustment slide assembly 1603. Channeled guide rails 1605 keep adjustment slide assembly 1603 flush to the sorter frame and allow adjustment slide assembly 1603 to only move in a back-to-front direction. Bulkhead plate 1617 is fastened to channeled guide rails 1605 to provide a frame mounted surface that adjustment slide assembly 1603 can be pulled forward using threaded pull rod assembly 1611 with tension spring 1616, end caps 1618, and adjustment nut 1622. If the chain slack exceeds the tension range of tension spring 1616, tension spring 1616 will move adjusting nut end cap 1618 to move away from bulkhead plate 1617, thereby triggering a position sensor 1623 that signals a control system programmable logic controller (PLC) that a chain slack adjustment is needed. A ruler 1627 can be included as a guide referencing the adjustment nut end cap position to view the relative amount of accumulated chain length increase since the last chain slack adjustment.

Slide assembly 1603 is mounted between two retaining rails 1605, which permits slide assembly 1603 to move left-to-right as shown in the figures. Idler gear 1207, stub idler axle 1211, and inner and outer axle bearings are all mounted to and move with slide assembly 1603. Adjustment rod 1611 and spring assembly 1616 are adjusted to compress spring assembly 1616 against the stationary bulkhead 1617 to pull slide assembly 1603 to the left. By pulling slide assembly 1603 to the left, stub idler axle 1211 and idler gear 1207 are also pulled to the left, thereby creating tension on chain 520 to remove any accumulated chain slack (see FIG. 5). If the chain slack eventually becomes excessive causing tension rod assembly 1611 to shift towards the left, sensor 1623 signals an indication to the control system that spring tension assembly 1616 requires adjustment. Slide assembly stop rod 1627 is adjustable to limit the rearward travel of slide assembly 1627. Thus, chain slack adjustment mechanism requires minimal maintenance, even for continuous duty operation with heavy parcel loads; automatically notifies the control system when adjustment is required; removes the highly troublesome chain slack accumulation at the rear motor driven end; and significantly reduces long-term chain wear and elongation resulting in significant operational savings due to reduced down time and maintenance costs.

Although chain slack adjustment mechanism 501 is preferably driven by the force of tension spring 1616, it will be appreciated that chain slack adjustment mechanism 501 may be driven and/or powered by other means, such as pneumatic, hydraulic, and/or electromagnetic systems. Such alternative systems may be controlled by the control system.

In FIGS. 11B and 11C, slide assembly 1603 of chain slack adjustment mechanism 501 has been shown in cross-hatched lines to show the movement of slide assembly 1603 due to chain wear. The shaded slide is pulled towards the left by tightening the adjustment nut, compressing the tension spring and added tension against the chain. By pulling slide assembly 1603 towards the left, the distance between drive axle 1214 and stub idler axles 1211 is increased, thereby removing the chain slack. The compressed spring 1616 provides tension on slide assembly 1603 to allow for moderate chain wear before manual chain slack adjustment is required by tightening the adjusting nut. The manual chain slack adjustment can be made while the conveyor system 500 is running, eliminating the need to do a time consuming and costly sorter shutdown.

Although the foregoing embodiments refer to removing the slack from the chains in chain-driven mail sortation systems, it will be appreciated that the slack removal mechanisms of the present application may also be used to remove the slack from belts in belt-driven mail sortation systems.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered, combined, and/or modified, and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms but is amenable to various changes and modifications without departing from the spirit thereof.

I claim:

1. A mail sortation system, comprising:
 a frame system;
 a conveyor carried by the frame system;
 a driven axle on one end of the conveyor, the driven axle having driven axle chain sprockets on each side of the conveyor;
 a pair of split idler axles, one idler axel on each side of the conveyor, the idler axles being on an opposite end of the conveyor from the driven axle, each idler axle having idler axel chain sprockets, the idler axels being configured to rotate independently of each other;
 a chain on each side of the conveyor, each chain being coupled to the conveyor, each chain passing over a driven axel chain sprocket and a corresponding idler axel chain sprocket, such that rotation of the driven axle causes the idler axles to rotate and the conveyor to translate; and
 a chain slack adjustment mechanism for removing slack in each chain, each chain slack adjustment mechanism being coupled to the frame system and being adjustably coupled to a corresponding idler axle;
 wherein the slack in each chain is removed by the chain slack adjustment mechanism by increasing the distance between the driven axle and the idler axles; and
 wherein a single adjustment bolt attached to a spring is used to adjust the distance.

2. The mail sortation system of claim 1, wherein the chain slack adjustment mechanism is adjusted in a sliding fashion.

3. The mail sortation system of claim 1, wherein the distance between the driven axle and the idler axles is manually adjusted by actuating the chain slack adjustment mechanism manually.

4. The mail sortation system of claim 1, wherein the distance between the driven axle and the idler axles is adjusted by the chain slack adjustment mechanism automatically.

5. The mail sortation system of claim 1, wherein the distance between the driven axle and the idler axles is adjusted by the chain slack adjustment mechanism automatically while the mail sortation system is operating.

6. The mail sortation system of claim 1, wherein the actuation of chain slack adjustment mechanism minimizes wear on the chains.

7. The mail sortation system of claim 1, wherein each chain slack adjustment mechanism comprises:
 at least one side rail coupled to the frame system; and
 a slide assembly slidingly coupled to the side rail, the slide assembly being coupled to one of the idler axles;
 wherein the idler axle slides relative to the frame system in response to movement of the slide assembly.

8. The mail sortation system of claim 7, wherein each chain slack adjustment mechanism further comprises:
 an adjustable tensioning rod assembly mounted to the slide assembly and the side rail, such that adjustment of the tensioning rod assembly causes the idler axle to slide relative to the frame system.

9. The mail sortation system of claim 8, wherein each chain slack adjustment mechanism further comprises:
 a tension spring operably associated with the tensioning rod for moving the tensioning rod in response to changes in the slack of the chain.

10. The mail sortation system of claim 8, wherein each chain slack adjustment mechanism further comprises:
 a position sensor configured to trigger a system alarm if the tensioning rod moves past a predetermined position.

11. The mail sortation system of claim 8, wherein each chain slack adjustment mechanism further comprises:
 an end stop travel adjustment assembly for limiting the rearward travel of the slide assembly during abnormal conditions.

12. The mail sortation system of claim 1, further comprising:
 a control system for controlling the operation of the chain slack adjustment mechanism.

13. A chain slack adjustment mechanism for adjusting slack in a chain of a mail sortation system having a frame, the chain slack adjustment mechanism comprising:
 at least one side rail coupled to the frame;
 a slide assembly slidingly coupled to the side rail;
 a single adjustment bolt attached to a spring; and
 an idler axle coupled to the slide assembly;
 wherein the idler axle slides relative to the frame in response to movement of the slide assembly.

14. The chain slack adjustment mechanism of claim 13, further comprising:
 an adjustable tensioning rod assembly mounted to the slide assembly and the side rail, such that adjustment of the tensioning rod assembly causes the idler axle to slide relative to the frame.

15. The chain slack adjustment mechanism of claim 14, further comprising:
 a tension spring operably associated with the tensioning rod for moving the tensioning rod in response to changes in the slack of the chain.

16. The chain slack adjustment mechanism of claim 14, further comprising:
 a position sensor configured to trigger a system alarm if the tensioning rod moves past a predetermined position.

17. The chain slack adjustment mechanism of claim 13, further comprising:
 an end stop travel adjustment assembly for limiting the rearward travel of the slide assembly during abnormal conditions.

18. The chain slack adjustment mechanism of claim 13, further comprising:
 a control system for controlling the operation of the chain slack adjustment mechanism.

19. A mail sortation system, comprising:
 a frame system;
 a conveyor carried by the frame system;
 a driven axle on one end of the conveyor, the driven axle having a driven axle belt pulley on each side of the conveyor;
 a pair of split idler axles, one idler axel on each side of the conveyor, the idler axles being on an opposite end of the conveyor from the driven axle, each idler axle having an idler axel belt pulley, the idler axels being configured to rotate independently of each other;
 a belt on each side of the conveyor, each belt being coupled to the conveyor, each belt passing over a driven axel belt pulley and a corresponding idler axel belt pulley, such that rotation of the driven axle causes the idler axles to rotate and the conveyor to translate; and
 a belt slack adjustment mechanism for removing slack in each belt, each belt slack adjustment mechanism being coupled to the frame system and being adjustably coupled to a corresponding idler axle;
 wherein the slack in each belt is removed by the belt slack adjustment mechanism by increasing the distance between the driven axle and the idler axles; and wherein a single adjustment bolt attached to a spring is used to adjust the distance.

20. The mail sortation system of claim 19, further comprising:
an adjustable tensioning rod assembly coupled to each belt slack adjustment mechanism, such that adjustment of the tensioning rod assembly causes the idler axle to slide relative to the frame system.

\* \* \* \* \*